(12) United States Patent
DeLuca et al.

(10) Patent No.: US 11,397,092 B2
(45) Date of Patent: Jul. 26, 2022

(54) DETERMINING DIRECTIONAL GUIDANCE FOR VEHICLES

(71) Applicant: INTERNATIONAL BUSINESS MACHINES CORPORATION, Armonk, NY (US)

(72) Inventors: Lisa Seacat DeLuca, Baltimore, MD (US); Jenny S. Li, Cary, NC (US); Dana L. Price, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 391 days.

(21) Appl. No.: 16/238,848

(22) Filed: Jan. 3, 2019

(65) Prior Publication Data

US 2020/0217679 A1 Jul. 9, 2020

(51) Int. Cl.
*G01C 21/34* (2006.01)
*G06N 5/04* (2006.01)

(52) U.S. Cl.
CPC ..... *G01C 21/3469* (2013.01); *G01C 21/3415* (2013.01); *G01C 21/3476* (2013.01); *G01C 21/3484* (2013.01); *G06N 5/04* (2013.01)

(58) Field of Classification Search
CPC ............ G01C 21/3469; G01C 21/3415; G01C 21/3484; G01C 21/3476; G06N 5/04; Y04S 30/12; Y02T 90/167
See application file for complete search history.

(56) References Cited

U.S. PATENT DOCUMENTS

| | | | |
|---|---|---|---|
| 9,395,198 B2 | 7/2016 | Dillahunt | |
| 2010/0094496 A1* | 4/2010 | Hershkovitz | B60L 3/12 701/22 |
| 2011/0224900 A1* | 9/2011 | Hiruta | G01C 21/3469 701/533 |

(Continued)

FOREIGN PATENT DOCUMENTS

CN    109102694 A    * 12/2018

OTHER PUBLICATIONS

EV Trip Planner; https://evtripplanner.com/; retrieved from the Internet Aug. 29, 2018; 1 page.

(Continued)

*Primary Examiner* — Michael V Kerrigan
(74) *Attorney, Agent, or Firm* — Schmeiser, Olsen & Watts, LLP; Michael A. Petrocelli

(57) ABSTRACT

A method, system, and computer program product for determining directional guidance for vehicles includes receiving a destination location and user information data related to a user of the vehicle. The method further includes determining the distance the vehicle can travel and predicting the availability of charging stations at a plurality of charging locations based on real time data and historical data. The method additionally includes determining relevant locations of interest to the user located near the plurality of charging locations based on the user information data. The method also includes determining and recommending route options and charging schedules to reach the destination location considering the distance the vehicle can travel, the predicted (Continued)

availability of charging stations, the relevant locations of interest, the total travel time, availability of locations of interest, user preferences, and charging location data.

18 Claims, 7 Drawing Sheets

(56) References Cited

U.S. PATENT DOCUMENTS

| | | | |
|---|---|---|---|
| 2012/0109519 A1 | 5/2012 | Uyeki | |
| 2014/0046585 A1* | 2/2014 | Morris, IV | G01C 21/3415 701/468 |
| 2014/0129139 A1* | 5/2014 | Ellison | G01C 21/3469 701/533 |
| 2017/0030728 A1* | 2/2017 | Baglino | G01C 21/3469 |
| 2017/0074677 A1 | 3/2017 | Macneille | |
| 2017/0168493 A1* | 6/2017 | Miller | G01C 21/3682 |
| 2018/0143029 A1 | 5/2018 | Nikulin | |
| 2019/0009683 A1* | 1/2019 | Saito | B60L 11/1848 |
| 2019/0126767 A1* | 5/2019 | Sakuma | B60L 53/14 |

OTHER PUBLICATIONS

Tesla Supercharger; https://www.tesla.com/supercharger; retrieved from the Internet Aug. 29, 2018; 6 pages.

TYTANX; Does the GPS Route by Destination Chargers? https://forums.tesla.com/it_IT/forum/forums/doesgpsroutedestinationchargers; Jun. 29, 2015; retrieved from the Internet Aug. 29, 2018; 1 page.

Mell, Peter et al.; "The NIST Definition of Cloud Computing;" National Institute of Standards and Technology; Special Publication 800-145; Sep. 2011; 7 pages.

* cited by examiner

US 11,397,092 B2

DETERMINING DIRECTIONAL GUIDANCE FOR VEHICLES

TECHNICAL FIELD

The present invention relates to systems and methods for providing directional guidance for vehicles. More specifically, the invention relates to systems and methods for considering electric vehicle needs and destination data in providing directional guidance.

BACKGROUND

Consumers today are increasingly turning to fully electric vehicles over traditional gas powered or hybrid vehicles. Currently, a user of an electric vehicle must remember to charge their electrical vehicles sufficiently before beginning a trip, find different charging locations along the route being taken on the trip, understand when to stop to recharge and for how long to recharge their electric vehicle, and hope that when they arrive at a charging location that there is an open charging station to charge the electric vehicle.

SUMMARY

An embodiment of the present invention relates to a method, and associated computer system and computer program product, of providing directional guidance for electric vehicles. One or more processors of a computer system receive a destination location for an electric vehicle. The one or more processors of the computer system receive user information data related to a user of the electric vehicle. The one or more processors of the computer system determine a distance the electric vehicle can travel. The one or more processors of the computer system predict the availability of charging stations at a plurality of charging locations, wherein the prediction is based upon real time data and historical charging location data. The one or more processors of the computer system determine relevant locations of interest to the user located proximate to the plurality of charging locations, wherein the relevance is based upon the user information data. The one or more processors of the computer system determines route options to reach the destination location considering the distance the electric vehicle can travel, the predicted availability of charging stations, the relevant locations of interest, and total travel time. The one or more processors of the computer system recommend the route options with charging schedules based upon the total travel time of each route option, availability of locations of interest, user preferences, and charging location data.

DETAILED DESCRIPTION

Figure 1:
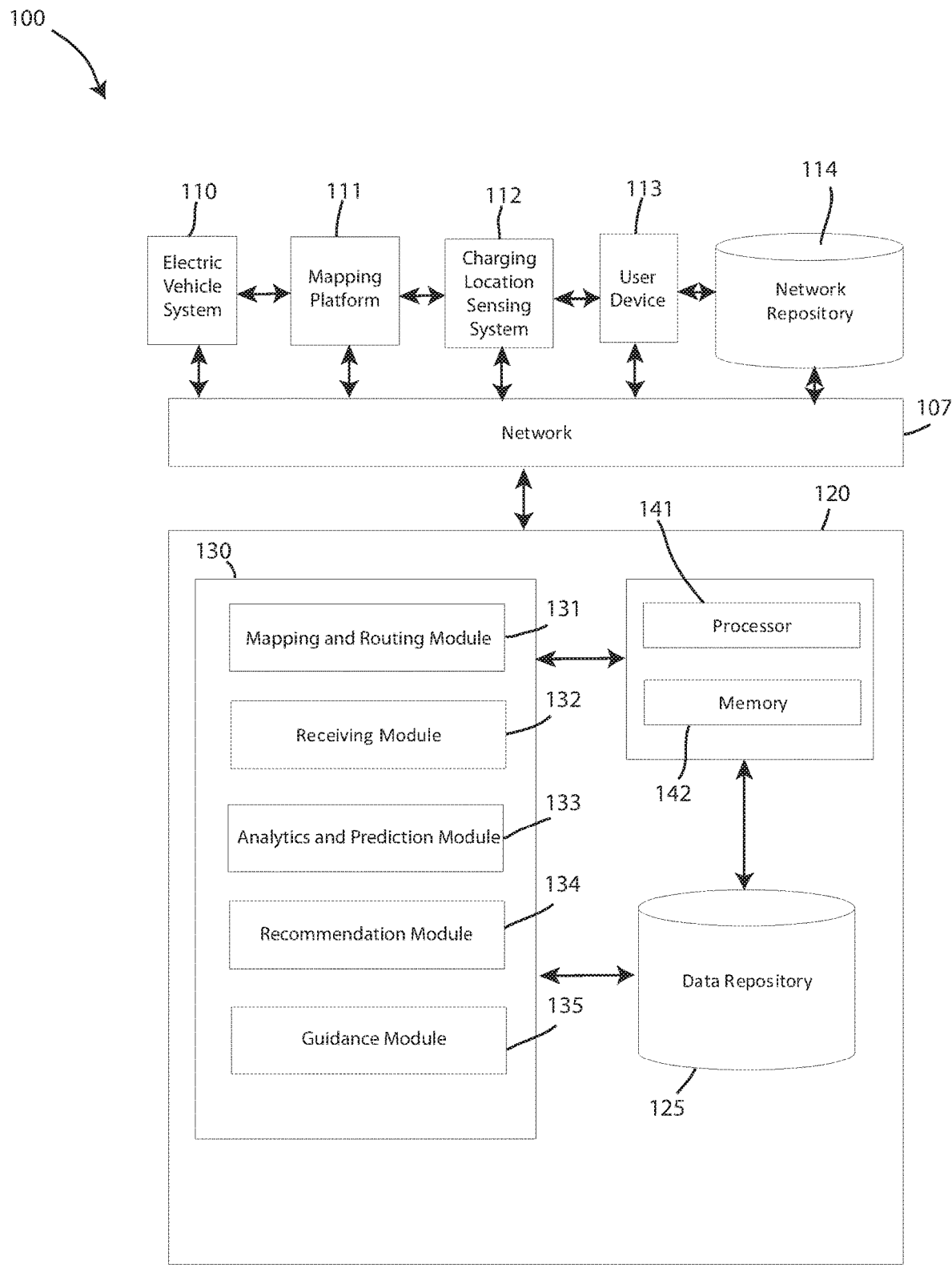
FIG. 1 depicts a block diagram of a system for providing directional guidance for electric vehicles, in accordance with embodiments of the present invention.

Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure. A more complete understanding of the present embodiments and advantages thereof may be acquired by referring to the following description taken in conjunction with the accompanying drawings, in which like reference numbers indicate like features.

As a preface to the detailed description, it should be noted that, as used in this specification and the appended claims, the singular forms "a", "an" and "the" include plural referents, unless the context clearly dictates otherwise.

Users today are increasingly purchasing fully electric vehicles over conventional gas, diesel and hybrid vehicles because of cost savings in running and maintaining electric vehicles along with the reduced levels of pollution and the desirability of using renewable energy and eco-friendly materials. However, with this change, users are looking for an easy and efficient way to remember to sufficiently charge their electric vehicle before a trip and, when users need to stop and re-charge, to know where charging locations are positioned and understand when to stop to recharge and for how long to recharge the electric vehicle. Today, if a user takes an extended trip in an electric vehicle, the user must determine how far the electric vehicle can travel with the current charge, locate charging locations along the route they are traveling, determine which charging locations to stop out and plan a charging schedule, and hope that when they arrive there is an open charging station at the charging location they have chosen.

This process is problematic because it requires users to predict the best charging location based on current charge levels and requires multiple steps and/or interactions over a number of different devices. Charging stations for electric vehicles are infrequent along most routes when compared with conventional gas stations, making selecting the correct charging locations crucial along a route in electric vehicles. Furthermore, it is extremely difficult for users to recalculate the best charging location when the distance the electric vehicle can travel changes due to driving conditions, speed, traffic, weather conditions, or other factors. Even when a user is able to choose a satisfactory charging location, there may be no charging stations available when the user arrives, creating further delays. Still further, it is difficult for users to know the correct amount of time to charge at each charging location along the route to reach their destination.

Additionally, it may take several hours for electric vehicles to reach sufficient charging levels, leaving users to sit and wait while the electric vehicle charges or hope that there is a location of interest relevant to the user located near the charging location. This causes problems for users who may have children in the car or who may not want to sit in a parked vehicle for a number of hours. Once at a charging location, users are limited to locations of interest that are within walking distance, making choosing a charging location with a relevant locations of interest nearby important for most users.

Present methods further do not provide for an easy way to provide this directional guidance. To provide directional guidance to an electric vehicle, it is known to consider available charging locations along a route to a destination location and the availability of charging stations at the charging locations. Existing methods may also display additional details about charging locations to users, such as locations of interest. However, existing technology today fails to consider users' personal preferences and locations of interests near available charging locations which may match the personal preferences of users when determining routes for electric vehicles and real-time and predicted availability of charging stations.

Thus, there is a need for methods and systems for providing directional guidance for electric vehicles that improves the deficiencies known in the art. The present invention will greatly improve the driving and charging experience for users of electric vehicles. The present invention, when practiced, will result in an improvement in computer technology by reducing computer resource usage because multiple steps will not need to be performed to accomplish the planning of a route and charging locations along the route for electric vehicles. When practiced, the present invention will result in an improvement in the charging experience of users of electric vehicles. Further, the present invention will result in increased efficiency in the driving and charging process for electric vehicles. The present invention will also result in an improvement of the marketing capabilities for companies located proximate to electric vehicle charging locations.

Referring to the drawings, FIG. 1 depicts a block diagram of a system for providing directional guidance for an electric vehicle 100, in accordance with embodiments of the present invention. Embodiments of a system for providing directional guidance for an electric vehicle 100 may be described as a system for considering relevant locations of interest, availability of charging stations, and charge data in determining route options for an electric vehicle. Embodiments of a system for providing directional guidance for an electric vehicle 100 may be described as a system for determining a recommended charging schedule for an electric vehicle. The system for providing directional guidance for an electric vehicle 100 may obtain a destination from users through the electric vehicle system 110 (such as through an on-board GPS system) or through a user device 113. The system for providing directional guidance for an electric vehicle 100 may obtain vehicle information (such as current charge levels, historical vehicle needs, speed of the vehicle, and the like) from the electric vehicle system 110 and use this information to determine the distance the electric vehicle can travel based on the current vehicle status and historical data.

Embodiments of the electric vehicle system 110 may include a computing device, on-board computing systems, one or more electronic control units (ECUs), a GPS system, and on-board sensors and systems (such as speed sensors, accelerometers, voltage sensors, charge sensors, and the like). While only one electric vehicle system 110 is shown, the number of electric vehicle systems 110 connecting to computer system 120 over network 107 may vary from embodiment to embodiment. For example, there may be a first electric vehicle system 110 to track location, a second electric vehicle system 110 to track current charge levels and energy consumption of the electric vehicle, and a third electric vehicle system 110 to track speed and motor data of the electric vehicle. The electric vehicle system 110 may track and store location data, navigational data, electric motor data, charging data, driving data, historical vehicle data driving characteristics of users (such as average speed, aggressive or passive driver), driving preferences of users, and the like.

A network 107 may refer to a group of two or more computer systems linked together. Network 107 may be any type of computer network known by individuals skilled in the art. Examples of computer networks 107 may include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA network or a mobile communications data network. The architecture of the computer network 107 may be a peer-to-peer network in some embodiments, wherein in other embodiments, the network 107 may be organized as a client/server architecture.

In some embodiments, the network 107 may further comprise, in addition to the computer system 120 and the electric vehicle system 110, a connection to one or more network accessible knowledge bases containing information of one or more users, network repositories 114 or other systems connected to the network 107 that may be considered nodes of the network 107. In some embodiments, where the computer system 120 or network repositories 114 allocate resources to be used by the other nodes of the network 107, the computer system 120 and network repository 114 may be referred to as servers.

The network repository 114 may be a data collection area on the network 107 which may back up and save all the data transmitted back and forth between the nodes of the network 107. For example, the network repository 114 may be a data center saving and cataloging user data sent by the electric vehicle system 110 and/or user device 113 to generate both historical and predictive reports regarding a users' and vehicle's movement or navigational habits, historical charging tendencies, different available charging locations, and driving condition predications. In some embodiments, a data collection center housing the network repository 114 may include an analytic module capable of analyzing each piece of data being stored by the network repository 114. Further, the computer system 120 may be integrated with or as a part of the data collection center housing the network repository 114. In some alternative embodiments, the network repository 114 may be a local repository (not shown) that is connected to the computer system 120.

The system for providing directional guidance for an electric vehicle 100 may include a mapping platform 111. The mapping platform 111 may include one or more navigational sensors and systems to provide digital maps, in one embodiment. The mapping platform 111 may be included as part of the electric vehicle, such as part of the electric vehicle system 110, the user device 113, or it may be a separate system. The mapping platform 111 may be a mapping application programming interface (API). The mapping platform 111 may include known mapping information such as street maps, locations of interests, business locations, and the like. For example, the mapping platform 111 may include information from Google Maps® or Apple Maps®. Further, the mapping platform 111 may include all known electric vehicle charging locations (such as Tesla Supercharger® locations). Additionally, the mapping platform 111 may include previously visited charging locations which may not have been known by any mapping platform, such as privately owned charging locations. The mapping platform 111 may include mapping information which is manually entered by users. For example, users may manually enter the location of a charging station which is known to them, locations of interest, or friends' and/or relatives' addresses or locations. Still further, the mapping platform 111 may include mapping information which is received through crowd sourcing or social media platforms.

The mapping platform 111 may also include locations of interest located near or proximate to charging locations. A location of interest may be a specific location, business, or activity that users may find interesting or useful. Locations of interest may include entertainment options, food options, retail options, nature options, physical activity options, tourist attraction options, and the like. For example, in some embodiments, locations of interest may be a mall, a retail store, a movie theater, a playhouse, a restaurant, an amusement or theme park, a zoo or aquarium, a science center, a gym, a sports complex, a stadium or arena, a sports game, a concert, a park, a landmark, a historic site or monument, a museum, a market, a tourist attraction, a library, or any other destination, activity, or location which may be of interest to users.

The mapping platform 111 may transform a traditional mapping system to include all potential charging locations for users along with locations of interest located near these charging locations. For example, the mapping platform 111 may provide maps and map information to users, but do so considering all known charging locations and locations of interest located proximate to the charging locations.

The system for providing directional guidance for an electric vehicle 100 may include a charging location sensing system 112. The charging location sensing system 112 may include sensors at known charging locations to indicate whether the charging station is currently in use by an electric vehicle. Further, the charging location sensing system 112 may include sensors within the charging stations to indicate the level of charge of the vehicle currently using the charging station. For example, the charging location sensing system 112 may provide information that a charging station at a charging location is currently in use and that the electric vehicle using the charging station currently has a charge level of 25%. Additionally, the charging station sensing system 112 may provide an estimated time until the electric vehicle currently using the charging station reaches a 100% charge level. The charging location sensing system 112 may include sensors which indicate whether any other vehicles are currently waiting to use a charging station. For example, a charging location may have no current open charging stations, but sensors may also indicate that a number of other vehicles are currently waiting to use charging stations when they become available. The charging station sensing system 112 may include environmental sensors, a camera, a camcorder, a motion sensor, a radar sensor, a charging sensor. In one embodiment, a sensor or camera may be located in each charging station at a charging location. In other embodiments, sensors or cameras may be disposed throughout the charging location so movement and monitoring of each charging station may be tracked or sensed. Thus, the charging location sensing system 112 may be configured in some embodiments to provide real-time and predicated availability of charging stations at a plurality of charging locations.

The system for providing directional guidance for an electric vehicle 100 may also include a user device 113 communicatively coupled to a computer system 120 over a network 107. In other embodiments, the user device may be embedded within the electric vehicle or couples with the electric vehicle system 110. Embodiments of the user device 113 may include a computing device, such as a smartphone, tablet device or digital personal assistant, associated with or operated by the user. The user device 113 may also be a wearable device such as a smart watch or the like. The user device 113 may run various applications that contain data about the user. For example, a user's smartphone may be used as a sensor, and may also utilize the device's camera, microphone, and other embedded sensors to send information to the computer system 120. Moreover, the user device 113 may be communicatively coupled to the computer system 120, and may transmit information over a network 107. The user device 113 may include one or more hardware components for sending/receiving geolocation data of the user device 113. The user device 113 may include a number of input devices for providing or inputting information to computer system 120 over the network 107. For example, the user device 113 may include a Bluetooth system, or other transmitting system configured to provide information from the user device 113 into the system. Input devices of the user device 113 may include an accelerometer, a gyroscope, a GPS system, biometric sensor, a wearable sensor, a microphone, a peripheral device, or the like.

Information provided by the user device 113 to the computer system 120 may be location information acquired by the gyroscope, accelerometer or GPS system of the user device 113. As shown in FIG. 1, the user device 113 may transmit user information data to the computer system 120. The user information data may be identifying data pertaining to users such as name, address, contact information, and the like. The user information data may also include personal preferences, likes/dislikes, dietary information, user interests, transaction history, internet history, social media data and other data pertaining to users' actions and history while using the user device 113.

Embodiments of the computer system 120 may include a mapping and routing module 131, a receiving module 132, an analytics and prediction module 133, a recommendation module 134, and a guidance module 135. A "module" may refer to a hardware based module, software based module or a module may be a combination of hardware and software. Embodiments of hardware based modules may include self-contained components such as chipsets, specialized circuitry and one or more memory devices, while a software-based module may be part of a program code or linked to the program code containing specific programmed instructions, which may be loaded in the memory device of the computer system 120. A module (whether hardware, software, or a combination thereof) may be designed to implement or execute one or more particular functions or routines.

Embodiments of the mapping and routing module 131 may include one or more components of hardware and/or software program code for creating digital maps of a driving environment and potential routes or set of directions for an electric vehicle. The mapping and routing module 131 may utilize information relating to a driving environment, such as street maps, relevant locations of interest, and charging locations to create a digital map of the driving environment for the electric vehicle. The information may be entered from the electric vehicle system 110, mapping platform 111, charging location sensing system 112, or the user device 113. Additionally, this mapping and routing module 131 may include a user interface so that a user may be configured to enter information related to the driving environment. For example, users may manually enter locations of interest, addresses, charging locations, friends or relatives address/locations, and destinations into the mapping and routing module 131. In other embodiments, the mapping and routing module 131 may obtain this information automatically from the electric vehicle system 110, the mapping platform 111, the charging location sensing system 112, or the user device 113. Data pertaining to the digital maps of driving environments may be located in the data repository 125 which is in communication with the mapping and routing module 131.

The mapping and routing module 131 may be enabled to calculate and provide routes, sets of directions, or a means of travel through the digitally mapped driving environment discussed above for an electric vehicle, taking into account the length of the trip, charging needs of the electric vehicle, the availability of charging locations and relevant locations of interest located proximate to the charging locations. The mapping and routing module 131 may provide a plurality of available or feasible routes. Whatever the embodiment, the mapping and routing module 131 may provide a module for mapping driving environments and determining possible routes for electric vehicles to travel through the driving environment which can be utilized by the computer system 120 as described herein below.

Embodiments of the receiving module 132 may include one or more components of hardware and/or software program code for obtaining, retrieving, collecting, or otherwise receiving information from the system for providing directional guidance for an electric vehicle 100. In one embodiment, the receiving module 132 may be configured for receiving information directly from the electric vehicle system 110. For example, vehicle related data, such as charging data, speed data, location data, electric motor data, and the like, may be received by the receiving module 132. Embodiments of the electric vehicle system 110 may be a component of the computer system 120, or may be external to the computer system 120, and connected to the computer system 120 over network 107. The receiving module 132 may provide information received by the computer system 120 from the electric vehicle system 110 to be stored in the data repository 125.

The receiving module 132 may also be configured for receiving information directly from the charging location sensing system 112. For example, the receiving module 132 may receive charging location data when a charging station is in use. The charging location sensing system 112 may be configured to provide availability information regarding charging stations to the receiving module 132. Availability information may be related to whether a charging station is currently in use, the current charge level of the electric vehicle using the charging station, or whether any vehicles are waiting to use the charging stations at a charging location. Still further, the receiving module 132 may be configured to receive historical information regarding charging stations. Historical information may include the past rate of use of a charging location, users' comments regarding charging location, or online complaints about a charging location from users, or common problems with a charging location.

In addition to receiving information form the electric vehicle system 110 and charging location sensing system 112, the receiving module 132 may be configured for receiving information directly from the mapping platform 111 regarding, for example, destinations, maps and map information, charging locations or locations of interest. For example, the receiving module may receive charging location coordinates from the mapping platform 111, from an API, for example. The receiving module 132 may provide information received by the computer system 120 from the mapping platform 111 to be stored in the data repository 125.

Still further, the receiving module 132 may be configured for receiving user information data from, for example, the user device 113. In an exemplary embodiment, the receiving module 132 receives user preferences from users through the user device 113. Users may manually input the user information data to the receiving module 132. Additionally, the receiving module 132 may be configured to automatically retrieve the user information data from the user device 113 through users' social media data, internet history, and the like. The information received by the receiving module 132 can be used for analysis and resulting actions by the analytics and prediction module 133 and the recommendation module 134, as described herein below.

Referring still to FIG. 1, embodiments of the computer system 120 may further include an analytics and prediction module 133 for analyzing and predicting the best routes or sets of directions for an electric vehicle. Embodiments of the analytics and prediction module 133 may refer to configurations of hardware, software program code, or combinations of hardware and software programs, capable of analyzing data received from the electric vehicle system 110, the mapping platform 111, the charging location sensing system 112, and/or the user device 113 to determine directional guidance for electric vehicles. The analytics and prediction module 133 may be configured to ascertain relevant locations of interest for a specific user based on the user's provided user information (such as likes, dislikes). In one embodiment, the analytics and prediction module 133 may use the locations of interest received by the receiving module 132 and compare them to the user's user information to find locations of interest which would be noteworthy for a specific user. For example, a user may have "liked" an upcoming movie on social media. A movie theater located near a charging location may be playing the movie around the time the user would be arriving to charge his/her electric vehicle. The analytics and prediction module 133 may identify the movie theater as a relevant location of interest for the user based on their interest in a movie playing at the theater. In another example, a user may enjoy a certain style of food, such as pizza. A pizza restaurant located within walking distance of a charging station may be marked as a relevant location of interest by the analytics and prediction module 133 based on the match of the user's interest and the services provided by the location of interest.

The analytics and prediction module 133 may also be configured for providing real-time and predicted availability of charging stations at a plurality of charging locations. The analytics and prediction module 133 may utilize information received by the receiving module 132 from the charging location sensing system 112 to predict when certain charging stations will become available. For example, sensors may indicate that all stations at a charging location are currently in use, but that all vehicles are at 100% charge, indicating that at least one of the vehicles will soon leave the charging location. The analytics and prediction module 133 may utilize remaining charge times of electric vehicles currently using charging stations and the number of vehicles in line waiting for charging stations to predict when certain charging stations will become available. Further, the analytics and prediction module 133 may utilize historical information about a charging location to modify the prediction. For example, if there is a history of complaints of users leaving fully charged vehicles at the charging location for extended periods of time, the analytics and prediction module 133 may determine that a charging station may not be available soon.

Additionally, the analytics and prediction module 133 may be configured for determining routes and directions for electric vehicles, taking into account charging needs, relevant locations of interest, and the availability of charging stations along the route. The analytics and prediction module 133 not only considers which route will reach the destination in the least amount of time, but also takes into account the charging needs of the vehicle and relevant locations of interest available to users while the user is charging the vehicle. The analytics and prediction module 133 determines guidance for the fastest route available with available charging stations. The guidance may also include relevant locations of interest located proximate to the charging stations which may match users' personal interests or choices. The relevant locations of interest may be used to prioritize or rank different available routes. For example, a route with more relevant, or better matched, locations of interest may be prioritized over a faster route with no relevant or matching locations of interest.

The analytics and prediction module 133 may also be configured for determining a charging schedule along with the guidance. The charging schedule may recommend how long users should charge an electric vehicle at certain charging locations along a route. For example, a route may require a first, second, and third charging stops at charging locations. The analytics and prediction module 133 may determine that the user should fully charge for 5 hours at the first charging stop because a full charge is required to reach the next available charging location. The analytics and prediction module 133 may find that the user should charge for 3 hours at the second charging stop because this matches the amount of time the user typically spends at a location of interest located near the second charging location and a full charge is not required going forward. Last, the analytics and prediction module 133 may determine that a 1 hour charge is appropriate at the third charging location because the user is close to the desired destination and there are limited locations of interest available. The analytics and prediction module 133 may also provide options of spending an extended time at one charging location or spending lesser amounts of time at different charging stations along a route (i.e. one 3 hour charge stop vs. three 1 hour charge stops).

The analytics and prediction module 133 may also be configured to determine ideal driving conditions for the guidance determined. The ideal driving conditions may include speed, whether cruise control should be utilized, weather conditions, traffic congestion or any other factors which may alter the distance an electric vehicle can travel. For example, the analytics and prediction module 133 may determine that a user should drive at 65 miles per hour over the route to best utilize the suggested guidance. In one embodiment, the analytics and prediction module 133 may track driving conditions and alter or modify routes in real time if driving conditions change to increase or decrease charging needs of an electric vehicle. For example, if a user runs into unexpected traffic congestions or inclement weather which delays travel time or adjusts the expected charge consumption, the analytics and prediction module 133 may alter the guidance in real time to provide a different route or different charge locations to fit the new charging needs and expected arrival time of the electric vehicle.

With continued reference to FIG. 1, embodiments of the computer system 120 may include a recommendation module 134. Embodiments of the recommendation module 134 may include one or more components of hardware and/or software program code for selecting, prioritizing, ranking, or evaluating different route options and charging schedules determined by the mapping and routing module 130 and the analytics and prediction module 133 to provide to users. In evaluating different route options, the recommendation module 134 may consider the time to reach the destination, the actual and predicted availability of charging stations at charging locations along the route, and relevant locations of interest located near the charging locations (taking into account user information data, as described above). For example, the recommendation module 134 may rank a route with multiple stops to charge higher than a route with a longer single charging stop if it knows a user prefers shorting charging periods, such preference being stored in the computer system 120 from the user information data. The recommendation module 134 may recommend routes with locations of interest near charging locations which match better to a particular user's interests over a route with less locations of interest near chosen charging locations relevant to that user, even when the route with better matching locations of interest takes a longer total time to reach the destination. Additionally, the recommendation module 134 may prioritize charging locations which users have identified or frequently used in the past, with known locations of interest significantly relevant to that user, such information being stored in the computer system 120 as part of the user information data. Still further, the recommendation module 134 may prioritize charging locations that are near locations of interest which users are known to be loyal to in order to encourage, for example, a shopping trip or a meal while the electric vehicle is charging. Still further, the recommendation module 134 may prioritize locations of interest based on external factors, such as the weather or crowdedness. For example, the recommendation module 134 may receive real time weather updates from an integrated source and determine that it is raining. The recommendation module 134 may then prioritize and indoor location of interest over an outdoor location of interest.

The recommendation module 134 may be configured for recommending the use of private charging locations when no routes are desirable using available public charging locations. The private charging locations may be entered by users and stored in the data repository 125, as part of the user information data, for example. The private charging locations may also be determined by the computer system 120 through crowd sourcing or social platforms which indicate available privately owned charging locations. The recommendation module 134 may also find that no desirable or feasible route is available and alter users. The recommendation module 134 may recommend the use of alternative vehicles (such as gas powered vehicles, ride sharing platforms, or public transportation). The recommendation module 134 may also recommend that users enter other known charging locations which may not have been previously known to the computer system 120, so that an available route may be determined.

The recommendation module 134 may also be configured for displaying the recommended routes to users. For example, the recommendation module 134 may provide a ranked list of potential routes to a user interface to be displayed. The user interface may be embedded as part of the computer system 120, it may be part of the electric vehicle system 110 (such as an on board display screen or GPS), or it may be part of the user device 113. The recommendation module 134 may also be configured to receive input from the user from the user interface, such as users selecting a route, so that the computer system 120 may begin guidance for that route.

Embodiments of the guidance module 135 may include one or more components of hardware and/or software program code for providing directional guidance to users based upon selected routes. In one embodiment, the guidance module 135 may function as a GPS system. In other embodiments, the guidance module 135 may provide guidance to each charging location along a selected route, indicating the recommended time to charge at each charging location. The guidance module map provides visual guidance to users, such as on a GPS map display, so that users are able to follow the selected route while using an electric vehicle. The guidance module 135 may provide directional guidance is a standalone display device, as part of the computer system 120, or it may transmit the guidance to the electric vehicle system 110 (to display on an onboard GPS, for example), or to a user device 113 (such as a mobile phone or GPS device). The guidance module 135 may be configured for updating routes in real time as driving conditions or the availability of charging stations change, as described above. The guidance module 135 may alert users of the changes affecting the current guidance and display the new recommended routes, as determined by the computer system 120.

Referring still to FIG. 1, embodiments of the computer system 120 may be equipped with a memory device 142 which may store the location information, information related to the mapping information, charging location information, user information data, electric vehicle information, charge data, and the like, and a processor 141 for implementing the tasks associated with the system for providing directional guidance for an electric vehicle 100.

The system for providing directional guidance for an electric vehicle 100 may also be configured for automatically reserving the use of a location of interest. Reserving the use may include automatically making a reservation, an appointment, purchasing a ticket, obtaining admission, placing an order, and the like. For example, a recommended route may include three locations of interest along the route, located near recommended charging locations. The three locations of interest may be a restaurant, a movie theater, and a museum. The system for providing directional guidance for an electric vehicle 100 may automatically make a reservation at the restaurant for the time the user is predicted to arrive at the restaurant, purchase a ticket to a movie of interest to the user at the time the user is predicted to arrive at the movie theater, and purchase an admission ticket to the museum. This may be accomplished at the direction of users, such as by the user entering purchasing information (such a credit card number or electronic payment information), or it may be done automatically when the user selects the route.

Still further, the system for providing directional guidance for an electric vehicle 100 may be configured for controlling or driving the electric vehicle along the selected route. In one embodiment, the system for providing directional guidance for an electric vehicle 100 may be connected to a self-driving or autonomous vehicle system such that the system is capable of sensing its environment and moving or driving along the selected route with little or no user input. In another embodiment, the electric vehicle system 110 may include a self-driving system such that the system for providing directional guidance for an electric vehicle 100 is enabled to control or drive the electric vehicle based on the directional guidance provided without any outside systems.

Figure 2:
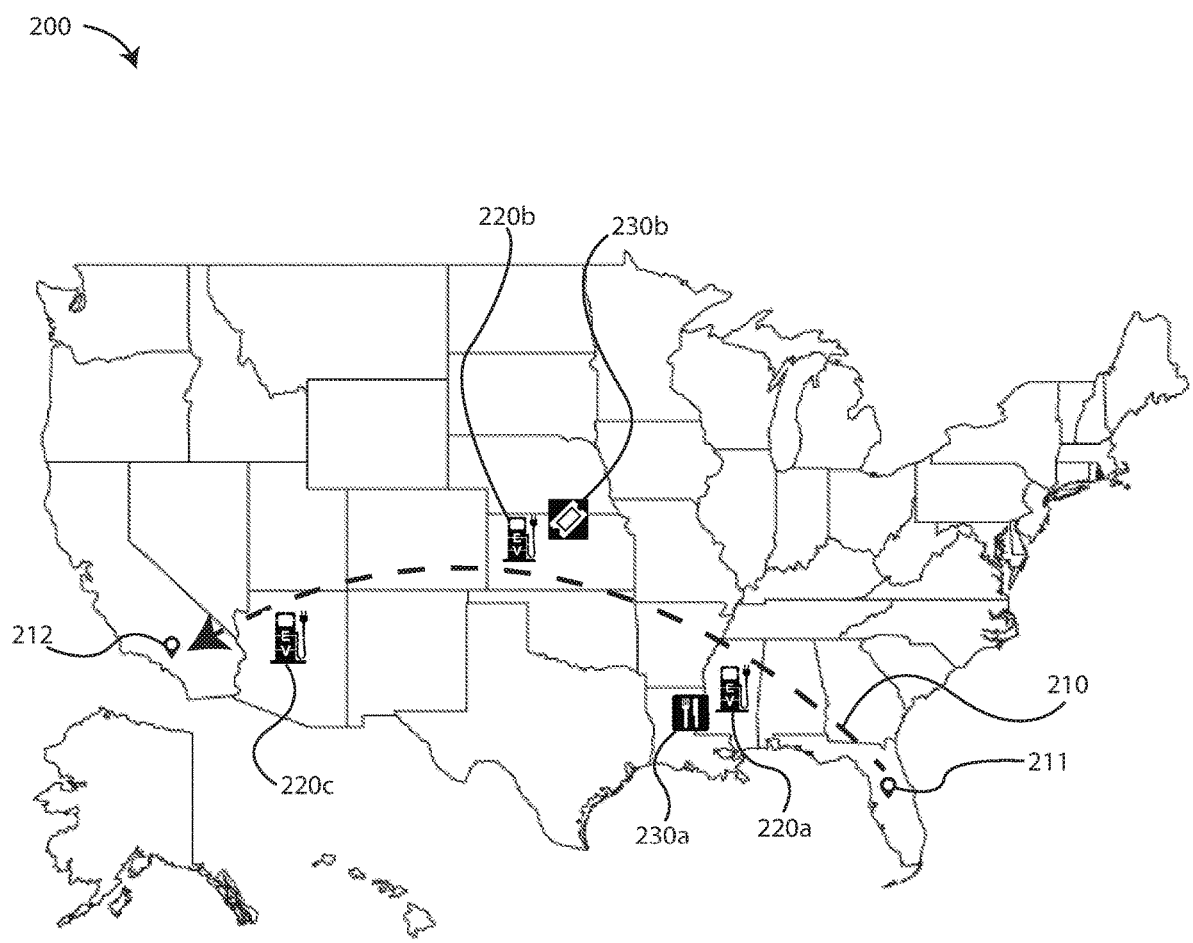
FIG. 2 depicts a schematic view of a driving environment of the system for providing directional guidance for electric vehicles of FIG. 1, in accordance with embodiments of the present invention.

FIG. 2 depicts a schematic view of a driving environment 200 of the system for providing directional guidance for an electric vehicle 100 of FIG. 1, in accordance with embodiments of the present invention. The driving environment 200 may include various components such as a route 210, with a starting location 211 and an ending location 212. The driving environment 200 may also include a plurality of charging locations. As shown, driving environment 200 includes three charging locations, 220a, 220b, and 220c, located along route 210. Still further, the driving environment 200 may include a plurality of locations of interest. As shown, driving environment 200 includes two locations of interest, 230a (located proximate to charging location 220a) and 230b (located proximate to charging location 220b). Location of interest 230a may be a restaurant and location of interest 230b may be a movie theater.

The route 210 may be a selected route by users from a list of recommended routes provided by the computer system 120, as described herein. The charging locations 220a, 220b, and 220c may be accompanied by a charging schedule such that users are told how long to charge the electric vehicle at each charging location. Still further, the locations of interest 230a and 230b may have been recommended based on the charging schedule and user information data. The route 210 may be chosen to correspond to the charging needs of an electric vehicle, the predicted availability of charging stations at charging locations 220a, 220b, and 220c, and the locations of interest 230a and 230b which may match the provided user information data.

For example, in one embodiment it is contemplated that a user at starting location 211 may enter the ending location 212 as the user's desired destination. The computer system 120 may then determine that, based on predicted driving conditions and the initial charging data of the electric vehicle, the user will need to stop near charging location 220a to charge the electric vehicle. Charging location 220a may be recommended because it is predicted to have charging locations available at the time the user is predicted to arrive in the area and because there is a restaurant (location of interest 230a) within walking distance of charging location 220a which matches the users dietary preferences and requirements. It may be recommended that the user charge the electric vehicle for a length of time required to reach the next available charging location, or for a time which matches the typical length of time for a meal at the restaurant. Next, the computer system 120 may determine that, based on the amount of charge in the electric vehicle after leaving the charging location 220a, the electric vehicle would need to charge in the area near charging location 220b. Charging location 220b may be recommended because it is predicted that there will be available charging stations at the time the user is predicted to arrive and because there is a movie theater (location of interest 230b) located within walking distance of charging location 220b. This movie theater may be recommended because, based on the user information data, it is determined that the movie theater is playing a movie which the user would be interested in viewing around the time the user is predicted to arrive at charging location 220b. The computer system 120 knows that the electric vehicle needs to charge for a longer period of time at charging location 220b to reach the next charging location, so a location of interest which a user typically spends more time at (such as watching a long movie) is preferable. The computer system 120 may next determine that the electric vehicle will need to charge near charging location 220c. Charging location 220c may be recommended because it has the best predicted availability of charging stations in the area and only a short charge time is required to reach the ending location 212. As only a short charge time is required, having a relevant location of interest is less important as users may not even leave their vehicle based on the recommended charging schedule, and the availability of charging stations is prioritized in recommending charging location 220c.

Figure 3:
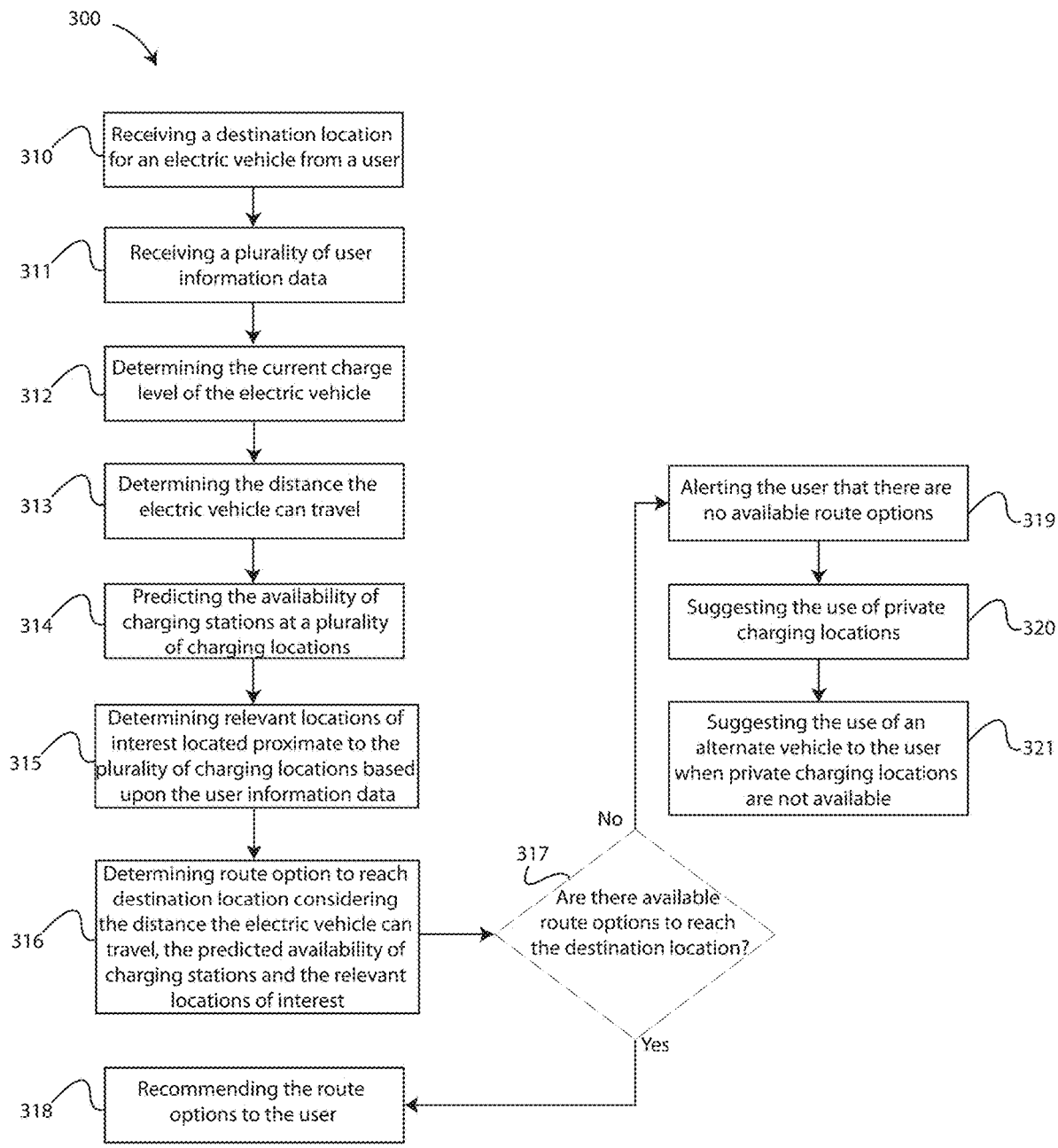
FIG. 3 depicts a flow chart method for providing directional guidance for electric vehicles, in accordance with embodiments of the present invention.

FIG. 3 depicts a flowchart of a method 300 for providing directional guidance for an electric vehicle, in accordance with embodiments of the present invention. The method 300 includes a first step 310 of receiving a destination location for an electric vehicle from a user. The method 300 has a next step 311 of receiving a plurality of user information data. The user information data, as discussed above, may include user preferences, likes/dislikes, identifying information, stored favorites, and the like. The user information data may be inputted manually by the user or it may be collected automatically from user devices or accounts (such as social media accounts) linked to the user. The method 300 continues to a step 312 of determining the current charge level of the electric vehicle. The method 300 has a next step 313 of determining the distance the electric vehicle can travel, based upon the current charge level, historical charging data (such as past charging needs of the vehicle, or miles per charge the vehicle has traveled in the past), and predicted driving conditions.

Method 300 continues with a step 314 of predicting the availability of charging stations at a plurality of charging locations. In one embodiment, this is accomplished by utilizing real time sensors at the charging locations indicating current usage and future use (i.e., indicating if there is a line of electric vehicles waiting to use charging stations) and historical trends or predictions at the charging locations to predict when certain charging stations at a plurality of charging locations will be available. The method 300 continues to a step 315 of determining relevant locations of interest located proximate to the plurality of charging locations based upon the user information data.

Continuing with method 300, there is a next step 316 of determining route options to reach the destination location considering the distance the electric vehicle can travel, the predicted availability of charging stations at charging locations, and relevant locations of interest located proximate to the charging locations. It should be understood that all of these elements are taken into consideration when determining the possible route options, but different elements may receive more weight based on the situation or the specific user. The method 300 has next step 317 of determining whether there are available route options to reach the destination location.

If there are available route options, the method 300 continues to a next step 318 of recommending the route options to the user. In one embodiment, the recommended routes may be ranked or prioritized in step 318. The routes may be ranked or prioritized based on route times (i.e. how long it will take to reach the destination location), the predicted availability of charging stations, and by locations of interest. For example, a route may be prioritized or ranked higher if it includes locations of interest which better match to the specific user's user information data (such as likes/dislikes or preferences). Further, a route which takes less time may be ranked higher than a route which takes more time. While the step 318 of recommending routes takes into account all of these factors, each factor may have a different weight depending on the user or the specific situation. For example, if a longer charge time is required, having a well matched location of interest to the user may be more important, whereas if the recommended charge time is short no location of interest may be required at all. A user may also be enabled to manipulate the weight given to each factor, such as within the user preferences. For example, a user may always want the quickest route prioritized or ranked first, whereas other users may always want the routes with the best matched locations of interest prioritized or ranked first.

In another embodiment, step 318 includes recommending the route options with charging schedules for each route option (i.e., the amount of time to charge the electric vehicle at each recommended charging location) based upon the distance to the destination location, availability of locations of interest, user preferences, and charging location data. The amount of time recommended to charge the electric vehicle at each charging location may correspond to the amount of time required for the electric vehicle to reach a sufficient charge level. In other embodiments, the amount of time recommended to charge the electric vehicle at each charging location may correspond to the amount of time users typically spend at locations of interest located proximate to the charging locations. For example, if a charging location is located next to a movie theater playing a movie a user would be interest in, the movie having a two hour runtime, the recommended charging time may be two hours to match the time a user would typically spend at the location of interest.

If it is determined that there are no available route options to reach the destination location, the method 300 proceeds to a step 319 of alerting the user that there are no available route options. The method 300 then has a next step 320 of suggesting the use of private charging locations not previously known entered by the user. The method 300 has a last step 321 of suggesting the use of an alternate vehicle (such as a gas powered or hybrid vehicle, or, in other embodiments, suggesting the use of a ride sharing platform) to the user if the use does not enter a new private charging location or no private charging locations are available.

Figure 4:
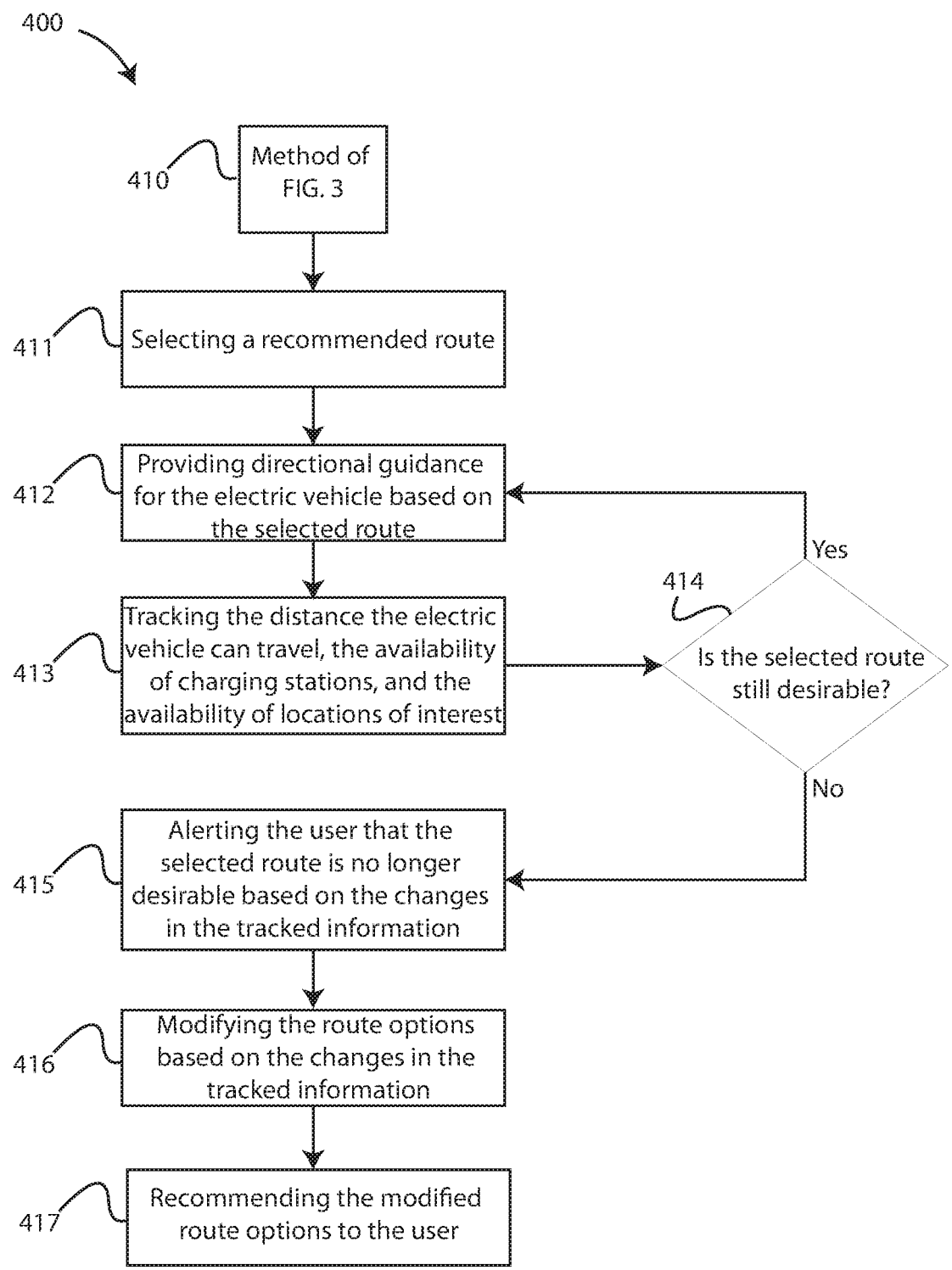
FIG. 4 depicts a flow chart method for providing directional guidance for electric vehicles, in accordance with embodiments of the present invention.

FIG. 4 depicts a flowchart of a method 400 for providing directional guidance for an electric vehicle, in accordance with embodiments of the present invention. The method 400 begins at step 410 which continues from method 300, for example after step 318 of recommending route options to a user. The method 400 continues from this to a step 411 of the user selecting a recommended route which is most desirable to the user. A user may make this decision based on the route which takes the least amount of time, or by the route which has the most relevant locations of interest to the user. The method 400 proceeds to a step 412 of providing directional guidance for the electric vehicle based on the selected route. The method 400 has a next step 413 of tracking the distance the electric vehicle can travel, the availability of charging stations, and the availability of locations of interest. The distance the electric vehicle can travel may be altered from the original determination (above in step 313 of method 300) based on a higher rate of consumption of charge by the electric motor, the driving of the user (for example, if the user drives faster than recommended or drives aggressively, the distance the electric vehicle may be reduced), traffic conditions, weather conditions and the like.

Method 400 has a next step 414 of determining whether the selected route is still desirable. A selected route may become undesirable based on changes in the information tracked during step 413. For example, the electric vehicle may no longer be able to reach the next charging location based on changes in the distance the electric vehicle can travel. Further, charging stations at the recommended charging locations may be predicted to be now unavailable at the time the user is predicted to arrive, making the charging location undesirable. Still further, delays in travel may result in locations of interest now being unavailable at the time the user is predicted to arrive at the charging location located proximate to the location of interest. If it is determined that the selected route is still desirable, the method 400 returns to step 412 and continues to provide directional guidance to the electric vehicle while tracking the information of step 413.

If it is determined that the selected route is no longer desirable, the method 400 continues to a step 415 of alerting the user that the selected route is no longer desirable based on the changes in the tracked information. The method 400 has a next step 416 of modifying the route options based on the changes in the tracked information. Step 416 may be accomplished by utilizing the method 300 discussed above, utilizing the altered information. The method 400 continues to a next step 417 of recommending the modified route options to the user. The step 417 may recommend modified routes by ranking or prioritizing them is a similar manner to step 318 of method 300, discussed above. Following step 417, the user may begin method 400 again by returning to step 411 and selecting a modified route from step 417, rather than a route from step 318, and proceeding through method 400 again. Thus, the method 400 is able to modify routes in real time as users are driving based upon changes in tracked information.

Advantageously, the present invention significantly enhances the efficiency in the driving and charging experience for users of electric vehicles. The processes and system described herein saves users significant time by reducing the number steps needed to plan and provide guidance for electric vehicles. Further, the present invention results in improvements in computer technology by reducing computer resource usage because multiple steps will not need to be performed to determine a charging schedule with relevant locations of interest nearby. Moreover, the present invention improves digital mapping and guidance technology by automatically incorporating user information and preferences when determining route guidance and charging schedules for electric vehicles. This enhances the efficiency of the digital mapping and guidance technology by planning routes based on user interests and electric vehicle needs, eliminating the need for users to seek out and plan activities or stops when charging electric vehicles. Still further, because the systems and methods automatically calculate charging needs and determine charging locations, the present systems and methods eliminate the possibility that users forget to charge or miscalculate the sufficient charge for their electric vehicles. Additionally, the present methods eliminate the need for users to traverse multiple mapping platforms and systems to determine guidance for an electric vehicle. Moreover, the present invention will result in an improvement of the marketing capabilities for third parties located near to electric vehicle charging locations.

Figure 5:
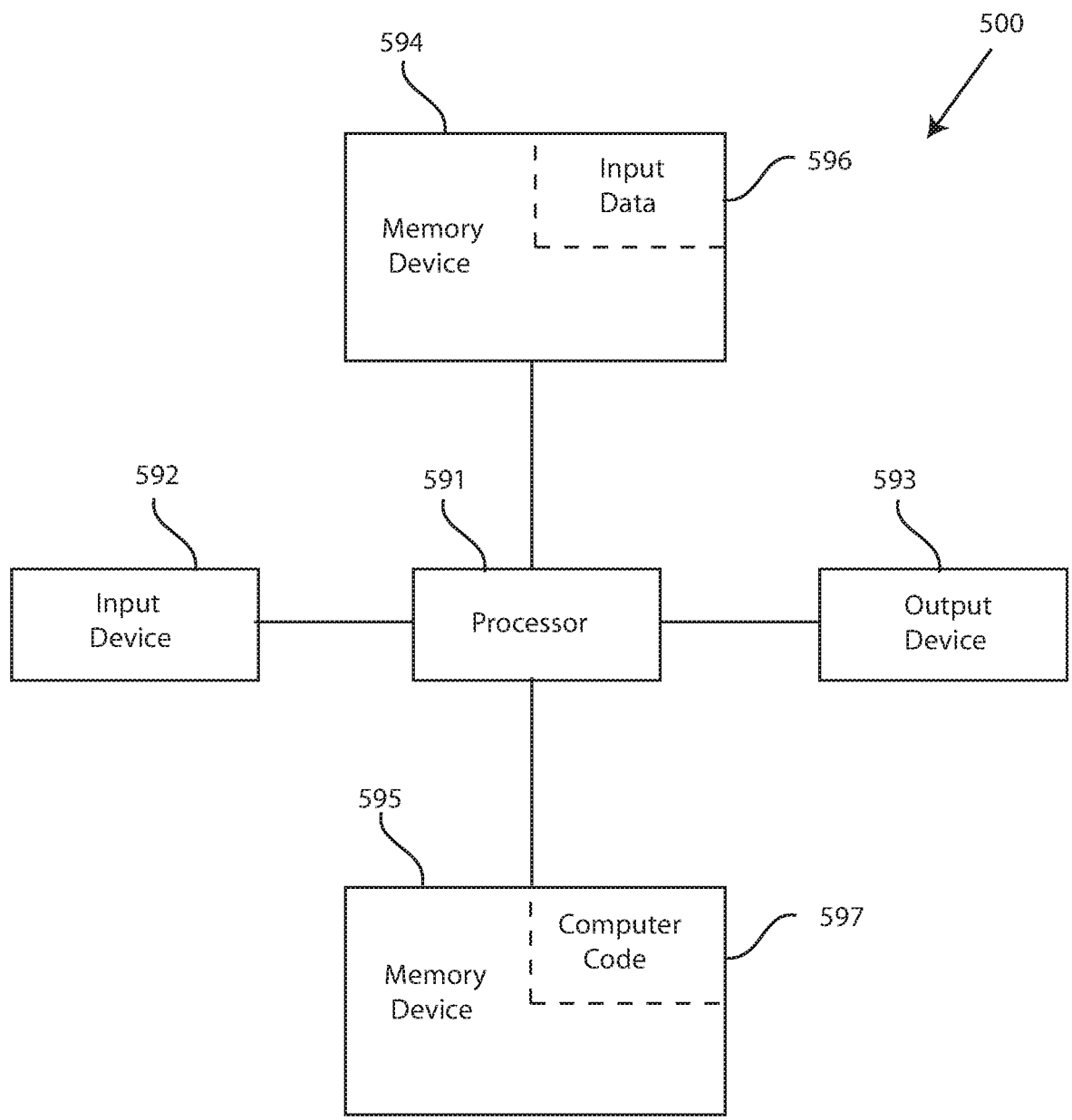
FIG. 5 depicts a block diagram of a computer system for providing directional guidance for electric vehicles system of FIGS. 1-2, capable of implementing methods for providing directional guidance for electric vehicles of FIGS. 3-4, in accordance with embodiments of the present invention.

FIG. 5 illustrates a block diagram of a computer system for the system for providing directional guidance for an electric vehicle of FIGS. 1-2, capable of implementing methods for providing directional guidance for an electric vehicle of FIGS. 3-4, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer 500, including executing instructions included in the computer code 597 for the tools and programs capable of implementing a method for providing directional guidance for an electric vehicle, in the manner prescribed by the embodiments of FIGS. 3-4 using the system for providing directional guidance for an electric vehicle of FIGS. 1-2, wherein the instructions of the computer code 597 may be executed by processor 591 via memory device 595. The computer code 597 may include software or program instructions that may implement one or more algorithms for implementing the methods for providing directional guidance for an electric vehicle, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer readable program embodied therein and/or having other data stored therein, wherein the computer readable program comprises the computer code 597. Generally, a computer program product (or, alternatively, an article of manufacture) of the computer system 500 may comprise said computer usable storage medium (or said program storage device).

Memory devices 594, 595 include any known computer readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 5.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository 125 as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to systems and methods for providing directional guidance for an electric vehicle. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer 500) including one or more processor(s) 591, wherein the processor(s) carry out instructions contained in the computer code 597 causing the computer system to provide a system for providing directional guidance for an electric vehicle. Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements a method for providing directional guidance for an electric vehicle. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method for providing directional guidance for an electric vehicle.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flow chart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flow chart and/or block diagram block or blocks.

The flow chart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
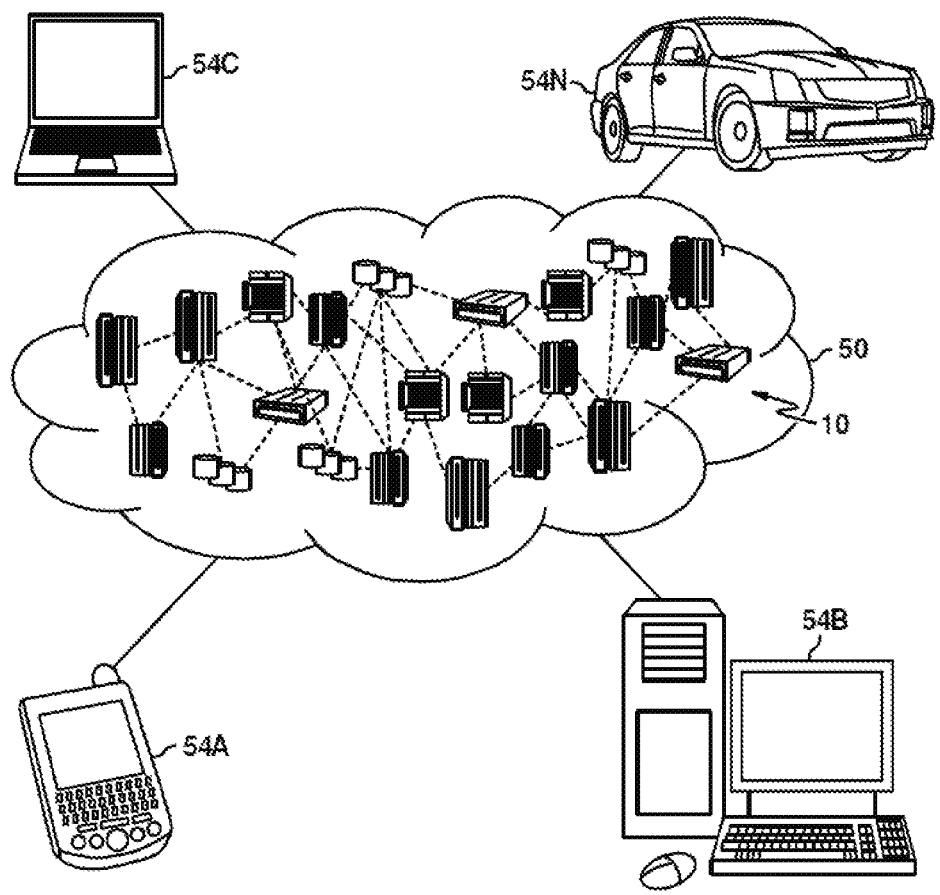
FIG. 6 depicts a cloud computing environment, in accordance with embodiments of the present invention.

FIG. 6 depicts a cloud computing environment 50, in accordance with embodiments of the present invention. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 6 are intended to be illustrative only and that computing nodes 10 and cloud computing environment 50 can communicate with any type of computerized device over any type of network and/or network addressable connection (e.g., using a web browser).

Figure 7:
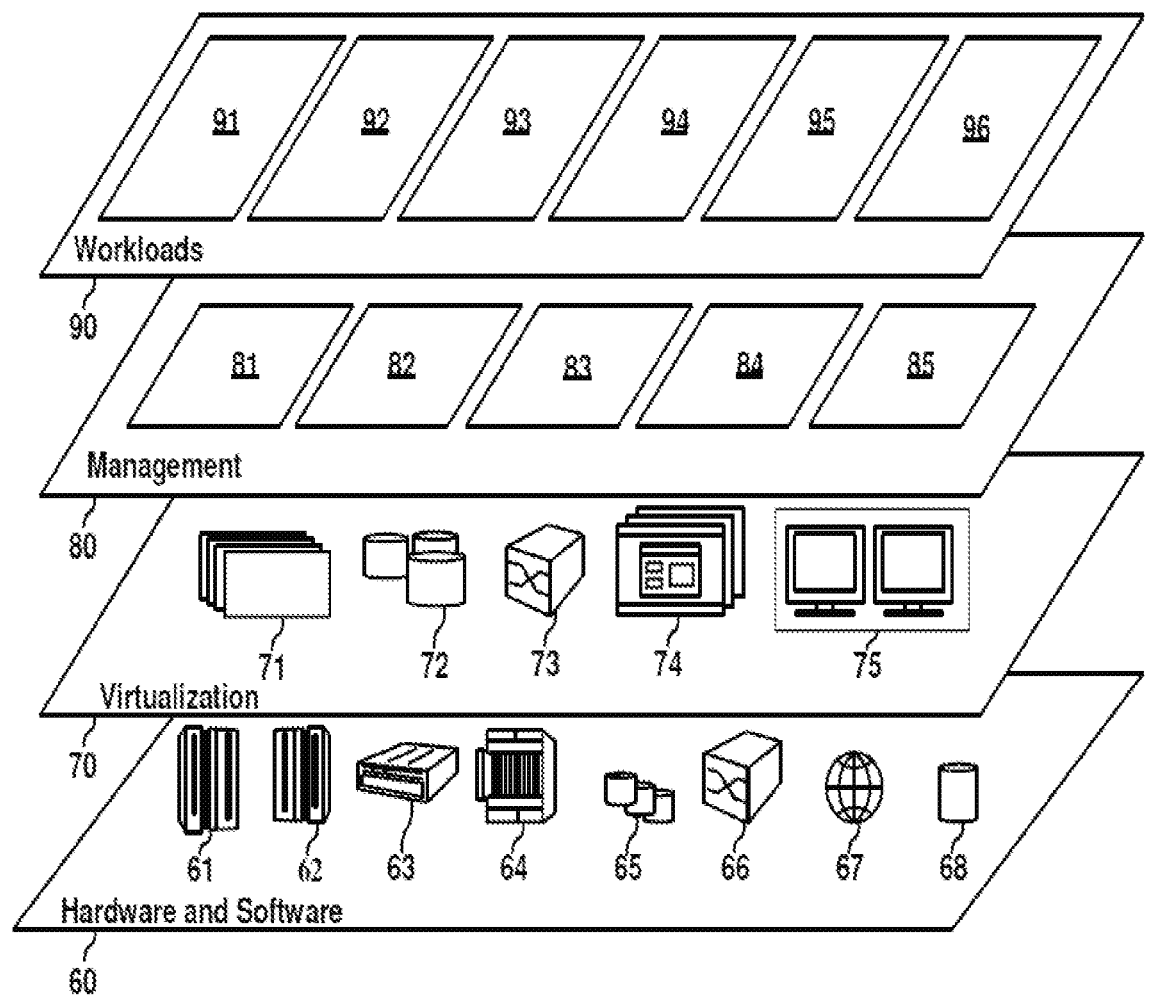
FIG. 7 depicts abstraction model layers, in accordance with embodiments of the present invention.

FIG. 7 depicts abstraction model layers, in accordance with embodiments of the present invention. A set of functional abstraction layers provided by cloud computing environment 50 (see FIG. 6) are shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing of directional guidance for an electric vehicle 96.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of providing directional guidance for electric vehicles, said method comprising:

receiving, by one or more processors of a computer system, a destination location for an electric vehicle;

receiving, by the one or more processors, data, said data including locations of interest to a user of the electric vehicle, said locations of interest being proximate to a plurality of charging locations, each charging location comprising a charging station configured to charge electric vehicles;

determining, by the one or more processors, a distance the electric vehicle can travel based on a current charge level of the electric vehicle;

receiving, by the one or more processors from a sensing system comprising one or more sensors at each charging station, a use status of whether each charging station is currently in use, a charge status of a current charge level of electric vehicles using each charging station, and a wait status of whether any vehicles are waiting to use each charging station;

predicting, by the one or more processors, availability of charging stations at the plurality of charging locations, said predicting the availability taking into account the use status, the charge status, and the wait status;

receiving, by the one or more processors from a speed sensor, a speed of the electric vehicle wherein the speed sensor senses the speed of the electric vehicle;

tracking and storing, by the one or more processors, an average speed of the electric vehicle;

determining, by the one or more processors, routes for the electric vehicle to reach the destination location, said determining routes based upon the distance the electric vehicle can travel, the predicted availability of charging stations, the locations of interest, and a total travel time of each route for the electric vehicle to travel to reach the destination location;

recommending, by the one or more processors, the routes and charging schedules indicating how long the user should charge the electric vehicle at the charging locations along each route, wherein said recommending the routes is based upon the total travel time of each route, availability of the locations of interest to the user located proximate to the charging locations of the plurality of charging locations, and user preferences with respect to the locations of interest;

displaying, by the one or more processors, the recommended routes to the user;

receiving, by the one or more processors from the user, a route selected by the user from the recommended routes;

recommending, by the one or more processors to the user, a speed at which to drive the electric vehicle, wherein the recommended speed is based on the charge level of the electric vehicle, the availability of charging stations, a distance to the destination location, weather conditions, and a distance to a next available charging station; and driving, by a hardware based module of a self-driving or autonomous vehicle system, the electric vehicle, wherein the hardware based module includes specialized circuitry used to implement driving the electric vehicle, and wherein driving the electric vehicle is based on the recommended speed.

2. The method of claim 1, said method further comprising:
tracking, by the one or more processors, the distance the electric vehicle can travel, the predicted availability of charging stations, and the availability of the locations of interest; and
modifying in real time, by the one or more processors, the recommended routes, wherein said modifying the recommended routes is based upon changes in the distance the electric vehicle can travel, the predicted availability of charging stations or the availability of the locations of interest.

3. The method of claim 1, said method further comprising:
determining, by the one or more processors, an amount of time typically spent at a first location of interest,
wherein said recommending the routes includes recommending, by the one or more processors, a charging stop at a first charging location located proximate to the first location of interest for a recommended charging time, said recommended charging time corresponding to the amount of time typically spent at the first location of interest.

4. The method of claim 1, said method further comprising:
determining, by the one or more processors, the current charge level of the electric vehicle,
wherein said determining the distance the electric vehicle can travel is based upon the current charge level of the electric vehicle and historical charging data of the electric vehicle.

5. The method of claim 1, said method further comprising:
suggesting, by the one or more processors, available private charging locations located proximate to the recommended routes, when no routes are desirable using available public charging locations.

6. The method of claim 1,
wherein the recommended routes comprise a first route and a second route,
wherein the total time to reach the destination location for the first route is greater than the total time to reach the destination location for the second route, and
wherein said recommending the routes includes prioritizing, by the one or more processors, the first route over the second route based upon the locations of interest proximate the charging locations pertaining to the first route.

7. A computer system, comprising: one or more processors; one or more memory devices coupled to the one or more processors; and one or more computer readable storage devices coupled to the one or more processors, wherein the one or more storage devices store program code, wherein the one or more processors are configured to execute the program code via the one or more memory devices to provide directional guidance for electric vehicles, wherein the one or more processors are configured to:

receive a destination location for an electric vehicle;
receive data, said data including locations of interest to a user of the electric vehicle, said locations of interest being proximate to a plurality of charging locations, each charging location comprising a charging station configured to charge electric vehicles;
determine a distance the electric vehicle can travel based on a current charge level of the electric vehicle;
receive from a sensing system comprising one or more sensors at each charging station, a use status of whether each charging station is currently in use, a charge status of a current charge level of electric vehicles using each charging station, and a wait status of whether any vehicles are waiting to use each charging station;
predict availability of charging stations at the plurality of charging locations, wherein predicting the availability takes into account the use status, the charge status, and the wait status;
receive, from a speed sensor, a speed of the electric vehicle wherein the speed sensor senses the speed of the electric vehicle;
track and store an average speed of the electric vehicle;
determine routes for the electric vehicle to reach the destination location, wherein determining routes are based upon the distance the electric vehicle can travel, the predicted availability of charging stations, the locations of interest, and a total travel time of each route for the electric vehicle to travel to reach the destination location;
recommend the routes and charging schedules indicating how long the user should charge the electric vehicle at the charging locations along each route, wherein recommending the routes is based upon the total travel time of each route, availability of the locations of interest to the user located proximate to the charging locations of the plurality of charging locations, and user preferences with respect to the locations of interest;
display the recommended routes to the user;
receive, from the user, a route selected by the user from the recommended routes;
recommend, to the user, a speed at which to drive the electric vehicle, wherein the recommended speed is based on the charge level of the electric vehicle, the availability of charging stations, a distance to the destination location, weather conditions, and a distance to a next available charging station; and drive, by a hardware based module of a self-driving or autonomous vehicle system, the electric vehicle, wherein the hardware based module includes specialized circuitry used to implement driving the electric vehicle, and wherein driving the electric vehicle is based on the recommended speed.

8. The computer system of claim 7, wherein the one or more processors are configured to:
track the distance the electric vehicle can travel, the predicted availability of charging stations, and the availability of the locations of interest; and
modify in real time the recommended routes, wherein modifying in real time the recommended routes is based upon changes in the distance the electric vehicle can travel, the availability of charging stations or the predicted availability of the locations of interest.

9. The computer system of claim 7, wherein the one or more processors are configured to:
determine an amount of time typically spent at a first location of interest,
wherein said to recommend the routes include to recommend a charging stop at a first charging location located proximate to the first location of interest for a recommended charging time, said recommended charging time corresponding to the amount of time typically spent at the first location of interest.

10. The computer system of claim 7, wherein the one or more processors are configured to:
determine the current charge level of the electric vehicle,
wherein said to determine the distance the electric vehicle can travel is based upon the current charge level of the electric vehicle and historical charging data of the electric vehicle.

11. The computer system of claim 7, wherein the one or more processors are configured to:
suggest available private charging locations located proximate to the recommended routes, when no routes are desirable using available public charging locations.

12. The computer system of claim 7,
wherein the recommended routes comprise a first route and a second route,
wherein the total time to reach the destination location for the first route is greater than the total time to reach the destination location for the second route, and
wherein said recommending the routes includes prioritizing, by the one or more processors, the first route over the second route based upon the locations of interest proximate the charging locations pertaining to the first route.

13. A computer program product, comprising a computer readable hardware storage device storing computer readable program code executable by one or more processors of a computer system to provide directional guidance for electric vehicles, wherein the one or more processors are configured to:
receive a destination location for an electric vehicle;
receive data, said data including locations of interest to a user of the electric vehicle, said locations of interest being proximate to a plurality of charging locations, each charging location comprising a charging station configured to charge electric vehicles;
determine a distance the electric vehicle can travel based on a current charge level of the electric vehicle;
receive from a sensing system comprising one or more sensors at each charging station, a use status of whether each charging station is currently in use, a charge status of a current charge level of electric vehicles using each charging station, and a wait status of whether any vehicles are waiting to use each charging station;
predict availability of charging stations at the plurality of charging locations, wherein predicting the availability takes into account the use status, the charge status, and the wait status;
receive, from a speed sensor, a speed of the electric vehicle wherein the speed sensor senses the speed of the electric vehicle;
track and store an average speed of the electric vehicle;
determine routes for the electric vehicle to reach the destination location, wherein determining routes are based upon the distance the electric vehicle can travel, the predicted availability of charging stations, the relevant locations of interest, and a total travel time of each route for the electric vehicle to travel to reach the destination location;
recommend the routes and charging schedules indicating how long the user should charge the electric vehicle at the charging locations along each route, wherein recommending the routes is based upon the total travel time of each route, availability of the locations of interest to the user located proximate to the charging locations of the plurality of charging locations, and user preferences with respect to the locations of interest;
display the recommended routes to the user;
receive, from the user, a route selected by the user from the recommended routes;
recommend, to the user, a speed at which to drive the electric vehicle, wherein the recommended speed is based on the charge level of the electric vehicle, the availability of charging stations, a distance to the destination location, weather conditions, and a distance to a next available charging station; and
drive, by a hardware based module of a self-driving or autonomous vehicle system, the electric vehicle, wherein the hardware based module includes specialized circuitry used to implement driving the electric vehicle, and wherein driving the electric vehicle is based on the recommended speed.

14. The computer program product of claim 13, wherein the one or more processors are configured to:
track the distance the electric vehicle can travel, the predicted availability of charging stations, and the availability of the locations of interest; and
modify in real time the recommended routes, wherein modifying in real time the recommended routes is based upon changes in the distance the electric vehicle can travel, the availability of charging stations or the predicted availability of the locations of interest.

15. The computer program product of claim 13, wherein the one or more processors are configured to:
determine an amount of time typically spent at a first location of interest,
wherein said to recommend the routes include to recommend a charging stop at a first charging location located proximate to the first location of interest for a recommended charging time, said recommended charging time corresponding to the amount of time typically spent at the first location of interest.

16. The computer program product of claim 13, wherein the one or more processors are configured to:
determine the current charge level of the electric vehicle,
wherein said to determine the distance the electric vehicle can travel is based upon the current charge level of the electric vehicle and historical charging data of the electric vehicle.

17. The computer program product of claim 13, wherein the one or more processors are configured to:
  suggest available private charging locations located proximate to the recommended routes, when no routes are desirable using available public charging locations.

18. The computer program product of claim 13,
  wherein the recommended routes comprise a first route and a second route,
  wherein the total time to reach the destination location for the first route is greater than the total time to reach the destination location for the second route, and
  wherein said recommending the routes includes prioritizing, by the one or more processors, the first route over the second route based upon the locations of interest proximate the charging locations pertaining to the first route.

* * * * *